United States Patent [19]

Veale

[11] Patent Number: 5,375,951

[45] Date of Patent: Dec. 27, 1994

[54] METHOD FOR MAKING BED FOR AUTOMATED MILLING MACHINE

[75] Inventor: John R. Veale, Manhattan Beach, Calif.

[73] Assignee: California Technical Marketing, Inc., Santa Monica, Calif.

[21] Appl. No.: 849,775

[22] Filed: Mar. 12, 1992

[51] Int. Cl.⁵ .............................................. B23C 3/00
[52] U.S. Cl. ................... 409/131; 144/2 D; 269/21; 409/219
[58] Field of Search ............. 144/2 D, 133 R; 409/131, 132, 197, 219; 269/21

[56] References Cited

U.S. PATENT DOCUMENTS

| | | | |
|---|---|---|---|
| 1,083,160 | 12/1913 | Villinger | 144/2 D |
| 1,564,349 | 12/1925 | Hires | 144/2 D |
| 2,454,992 | 11/1948 | Coleman | 144/2 D |
| 3,463,476 | 8/1969 | Maria et al. | 269/21 |
| 4,112,986 | 9/1978 | Strange et al. | 144/133 R |

FOREIGN PATENT DOCUMENTS

| | | | |
|---|---|---|---|
| 17146 | 12/1928 | Australia | 144/2 D |
| 2833372 | 2/1980 | Germany | 144/2 D |
| 751253 | 6/1956 | United Kingdom | 269/21 |

Primary Examiner—Daniel W. Howell

[57] ABSTRACT

A method for making a bed for a gantry-style milling machine, where said machine has a routing spindle which said machine is capable of moving in the X, Y and Z directions, and where said machine has means to support a bed, comprising placing material millable by the machine on said support means and planing said material level with the machine.

5 Claims, 8 Drawing Sheets

METHOD FOR MAKING BED FOR AUTOMATED MILLING MACHINE

1. Field of Invention

This invention relates to automated milling machines.

2. Description of Prior Art

The purpose of this present invention is to provide a simple and effective method for making a bed for an automated milling machine. As used herein, "milling" and "routing" are synonymous. Basically, these terms mean the cutting, trimming and/or grinding of metal, wood, plastic or other materials. Automated milling machines are, as a general rule, milling machines which mill with coordinated movement of a routing spindle in the direction of the X axis, the direction of the Y axis and the direction of the Z axis. As is commonly understood in the industrial automation industry, motion in the Z direction means motion along an axis perpendicular to level ground, that is up and down. Motion in the X direction means motion in an axis parallel to level ground. Motion in the Y direction means motion in an axis also parallel to level ground, but perpendicular to the direction of the X axis.

Generally, such milling machines have a bed which serves to support the material which is to be milled. Generally, the surface of the bed is in a horizontal position, that is parallel to the X-Y plane. Usually, the bed surface is rectangular. The direction along the rectangle which is the longest is referred to as the X direction and the direction along the rectangle which is the shortest is the Y direction A milling spindle is usually supported above the bed, with the spindle pointing downward in the Z direction. Movement in the Z direction is achieved by moving the spindle up and down by virtue of a linear drive system, such as, but not limited to, a motor driven lead screw assembly, although sometimes motion in the Z direction is achieved by moving the bed.

Movement in the X direction and the Y direction is usually achieved in one of two ways. First, some milling machines operate to move the spindle in the X and Y directions. Gantry-style milling machines utilize this method. In such a machine the spindle is supported by a gantry above the surface of the bed which is movable along the X direction. At the same time, the spindle, while still pointing downward, is movable along the gantry in the Y direction. Second, some milling machines achieve motion in the X and Y directions by movement of the bed in the X and Y directions.

Generally, these beds are constructed of iron, alloys or other metals. They are manufactured separately of the rest of the milling machine and are installed in finished form. These beds and their respective machines tend to be expensive because they must be very precisely made. Also, if a router bit is accidentally allowed to move too far downward the bed can be damaged and must be replaced.

OBJECTS AND ADVANTAGES

The present invention is a method for making a bed for an automated milling machine which is less expensive and more practical than other automated milling machine beds currently on the market. Basically, the present invention utilizes the milling machine into make its own bed. Should the bed be damaged, it can be repaired by the milling machine or inexpensively be replaced. Accordingly, the present invention has the following objects and advantages:

a. The bed can be made inexpensively;
    b. the bed can be easily repaired if accidentally damaged; and
    c. having the machine make its own bed is an inexpensive way to make the machine more precise.

DRAWING FIGURES

The features of a specific embodiment of the best mode contemplated of carrying out the invention are illustrated in the drawings, in which.

LIST OF REFERENCE NUMERALS

1. Slide Rail With Drive
2. Rail Support Frame
3. Base Support Frame
4. Gantry Rail With Drive
5. Spindle Assembly
6. Screw Clamp
7. Rail Support Frame Mounting Plate
8. Base Support Frame Mounting Plate
9. Spindle Motor
10. Routing Bit
11. Bed
12. Vacuum Channel
13. Raised Panel
14. Vacuum Hole
15. Vacuum Tube
16. Vacuum System
17. Cover
18. Small Hole
19. Milling Machine Controller

DESCRIPTION—FIGS. 1 TO 4

Figure 1:
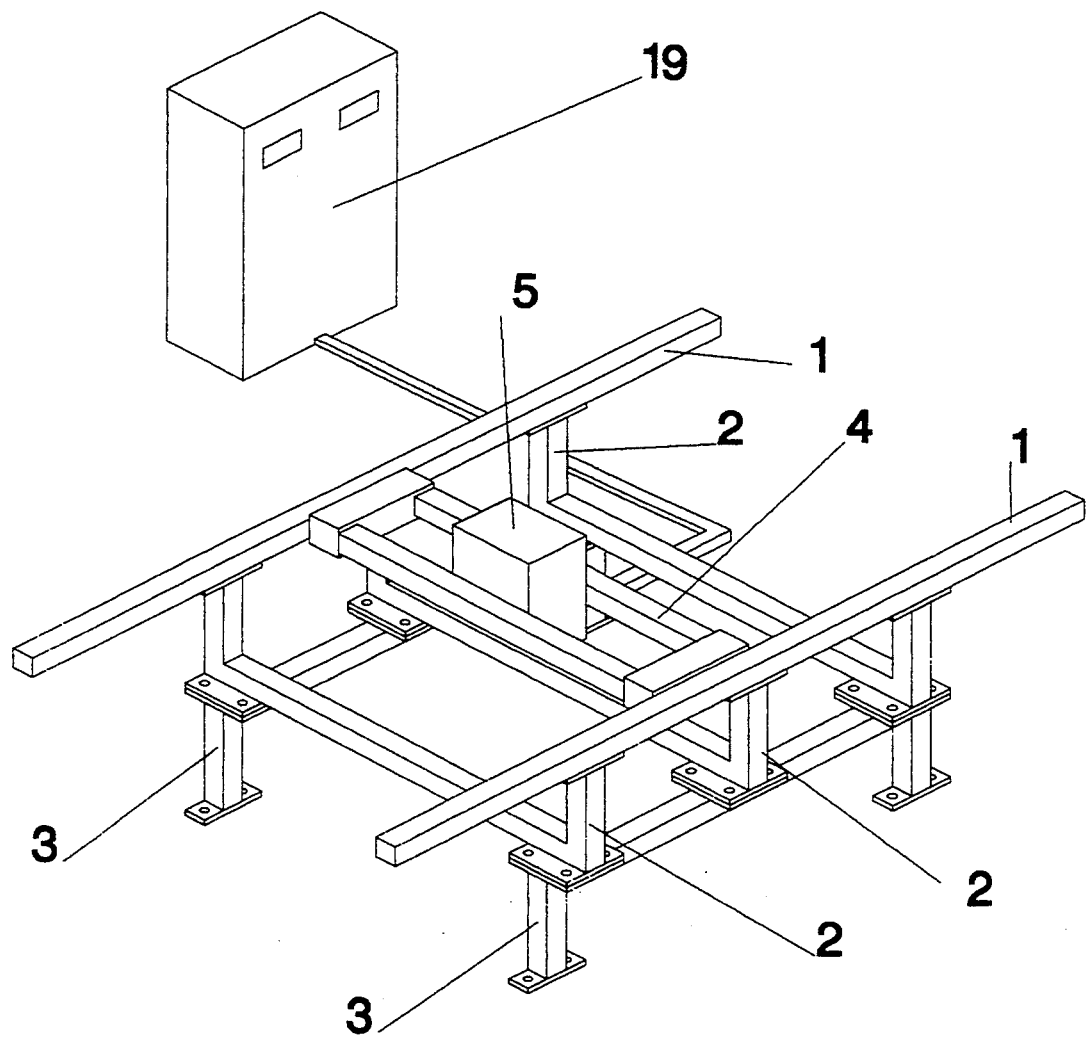
FIG. 1 is a perspective view of a gantry-style automated milling machine.

A typical embodiment of a milling machine is illustrated in FIG. 1 (perspective view). This gantry-style milling machine has two slide rails (1), each with a drive. The length of each slide rail is in the X direction. There are also three rail support frames (2) which support said slide rails. In turn, two base support frames (3) support the rail support frames. The gantry is comprised of two gantry rails (4), each with a drive. There is also a spindle support assembly with drive (5). The various drives are controlled and automated by a controller (19).

Figure 2A:
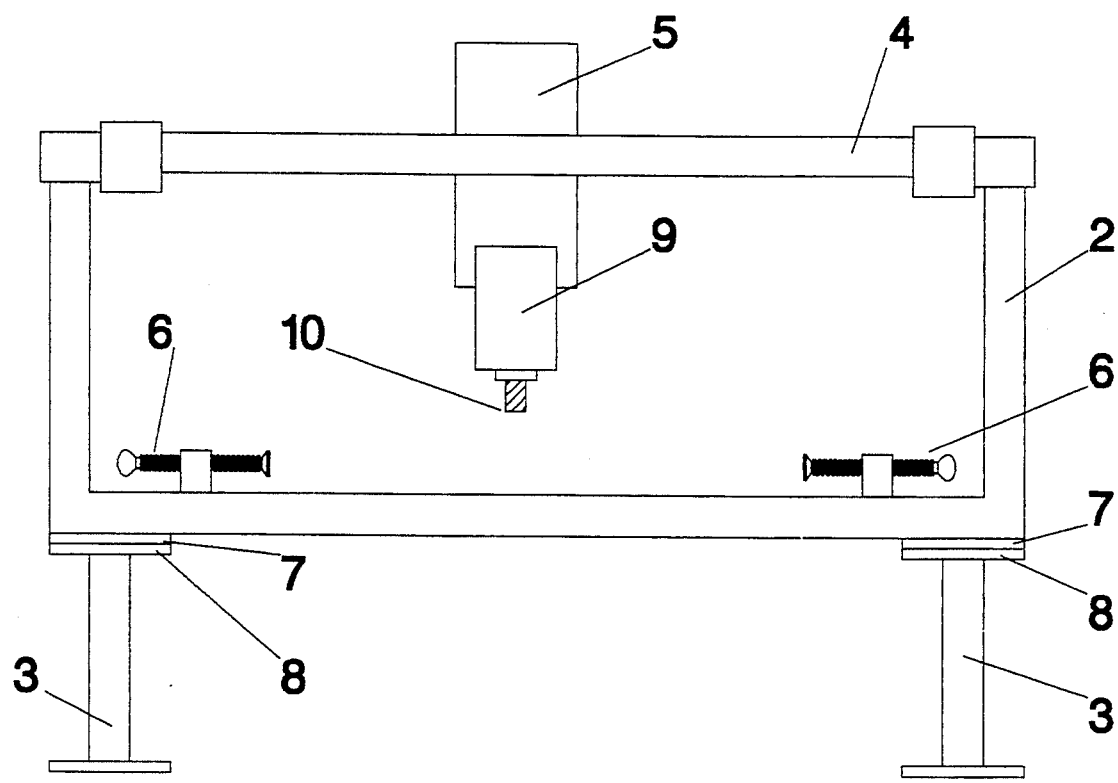
FIG. 2A is a side view of the gantry-style automated milling machine illustrating the procedure of making the bed.

FIG. 2A is a side view of the gantry-style milling machine, before the method of making a bed is commenced. There is shown a rail support frame (2), two base support frames (3), a gantry rail with drive, the spindle support assembly with drive (5), two clamps (6), rail support frame mounting plates (7), base support frame mounting plate (8), spindle motor (9), and routing bit (10).

Figure 2B:
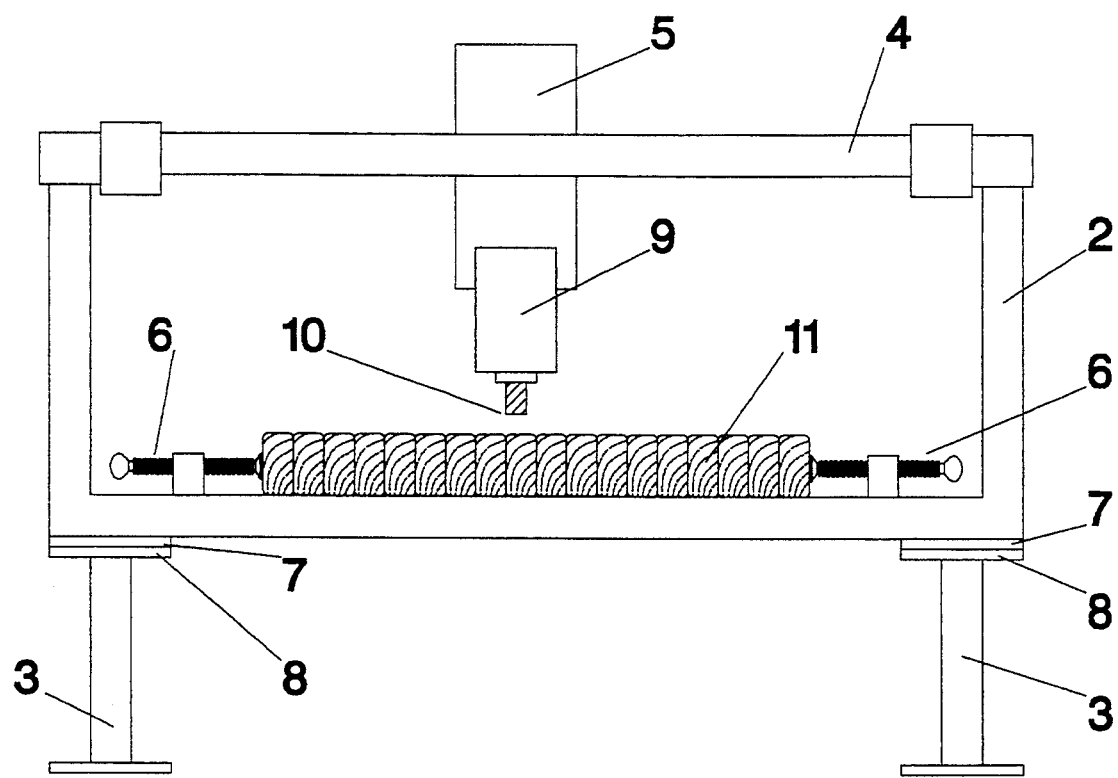
FIG. 2B is a side view of the gantry-style automated milling machine further illustrating the procedure of making the bed.

FIG. 2B is also a side view of the gantry-style milling machine, after material which is millable by the gantry-style milling machine is placed on the rail support frames and clamped in. There is shown a rail support frame (2), two base support frames (3), a gantry rail with drive, the spindle support assembly with drive (5), two clamps (6), rail support frame mounting plates (7), base support frame mounting plate (8), spindle motor (9), a routing bit (10), and material millable by the gantry-style milling machine placed on the rail support frame as a bed. In this illustration, the millable material is composed of wood 2 by 4's cut to an appropriate length and laid side by side with their lengths in the X direction.

Figure 2C:
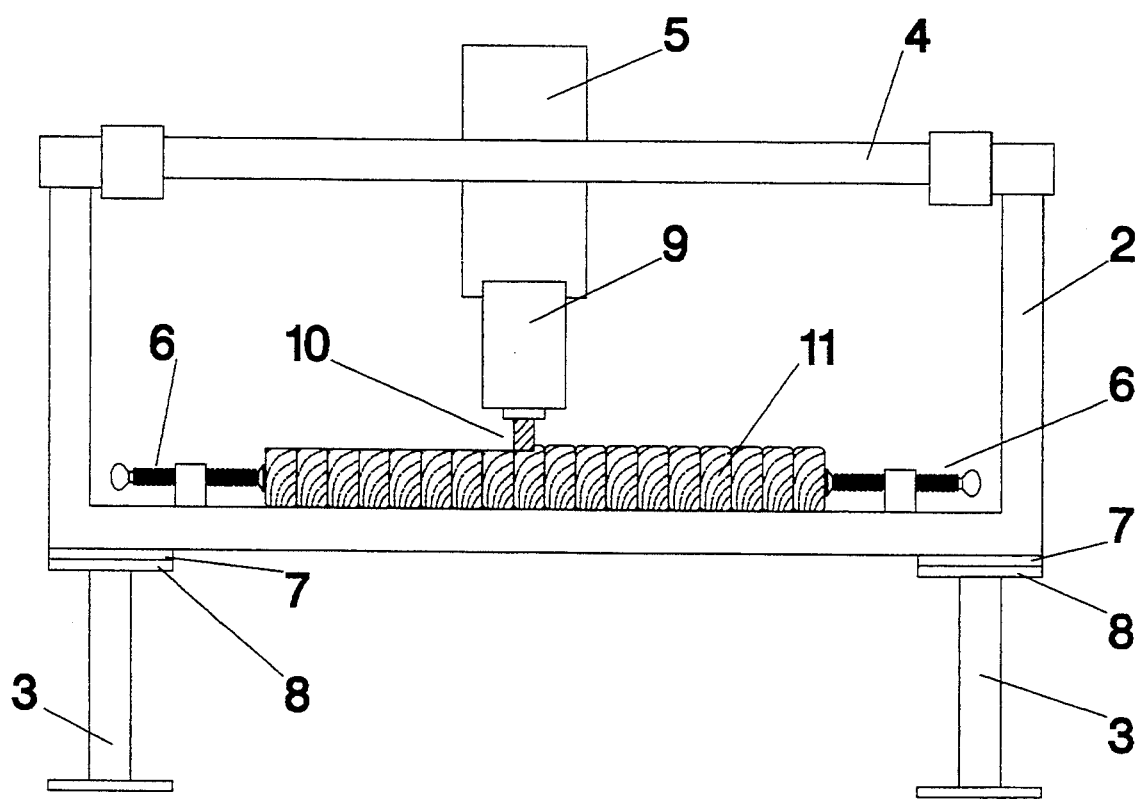
FIG. 2C is a side view of the gantry-style automated milling machine further illustrating the procedure of making the bed.

FIG. 2C illustrates the next step in the process, which is to plane the surface of the bed level with the gantry-style milling machine. As used herein, "to plane" means to make smooth or level with a routing bit.

Figure 2D:
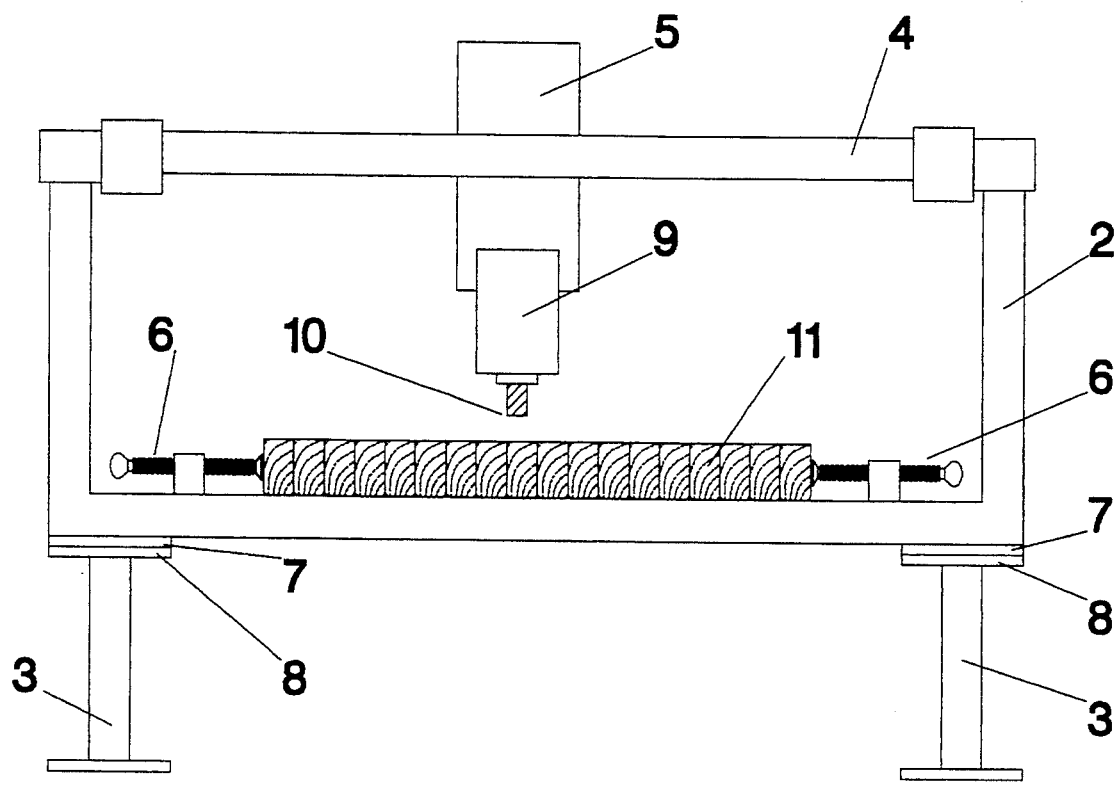
FIG. 2D is a side view of the gantry-style automated milling machine further illustrating the procedure of making the bed.

FIG. 2D illustrates the gantry-style milling machine and bed after the planing process is complete.

Figure 3:
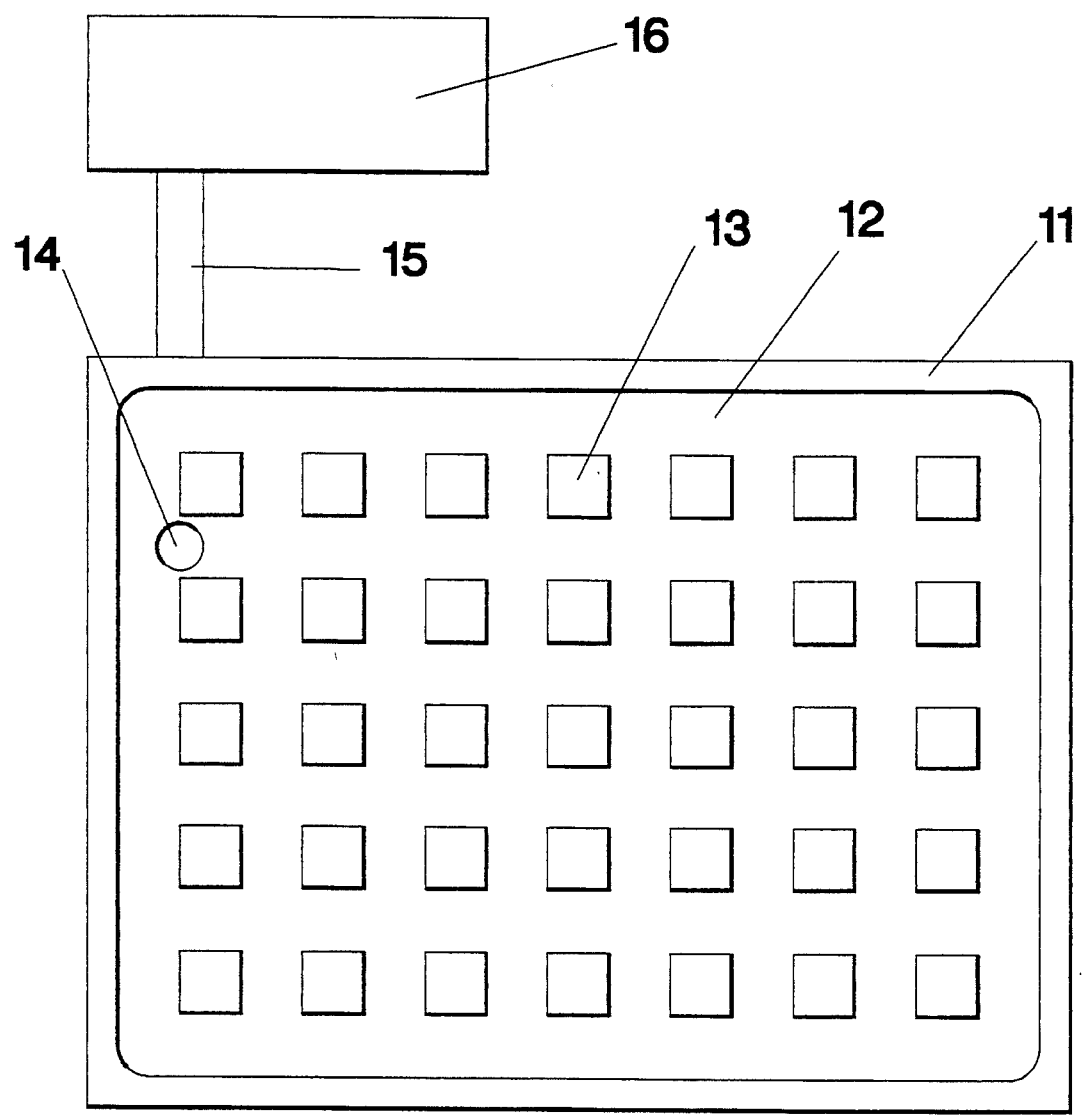
FIG. 3 is a top view of the bed after being cut to create a vacuum table.

FIG. 3 is a top view which illustrates the bed after it is cut to create a vacuum table. Shown in FIG. 3 are the bed (11), vacuum channels (12), raised panels (13), a vacuum hole (14), a vacuum tube (15) and a vacuum system (16).

Figure 4A:
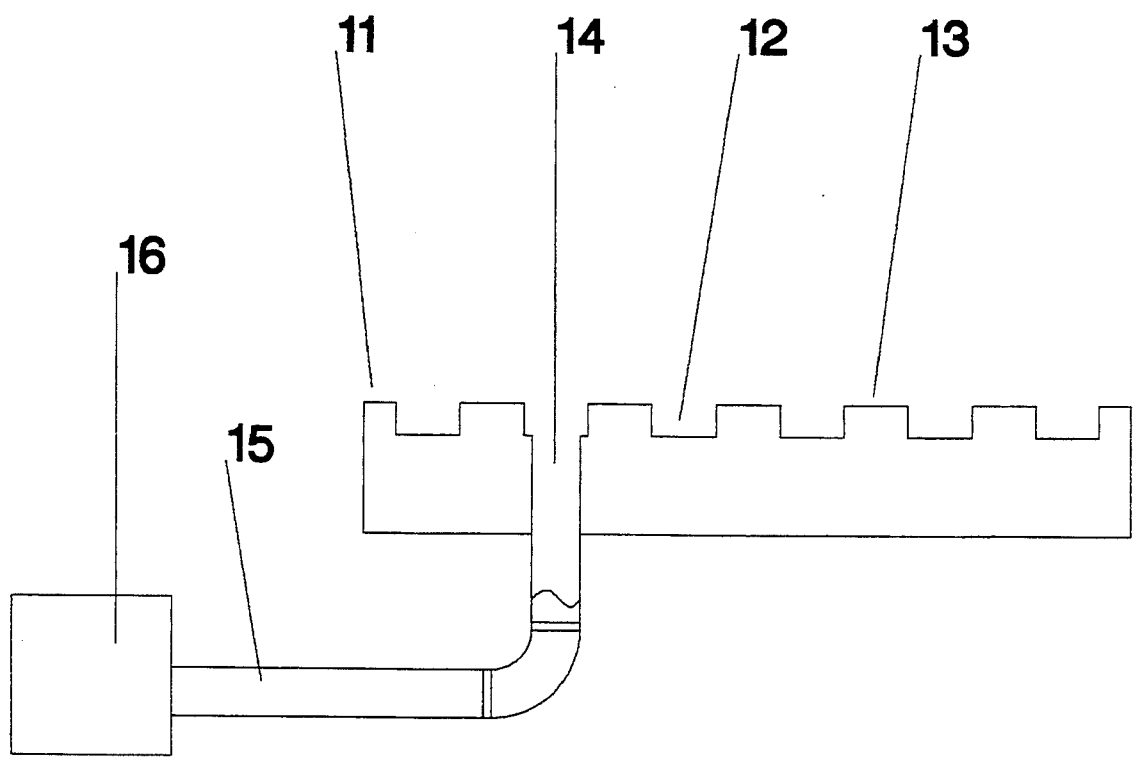
FIG. 4A is a side view of a bed after being cut to create a vacuum table.

FIG. 4A is a side view which illustrates the bed after it is cut to create a vacuum table. Shown in FIG. 4 are the bed (11), vacuum channels (12), raised panels (13), a vacuum hole (14), a vacuum tube (15), and a vacuum system (16).

Figure 4B:
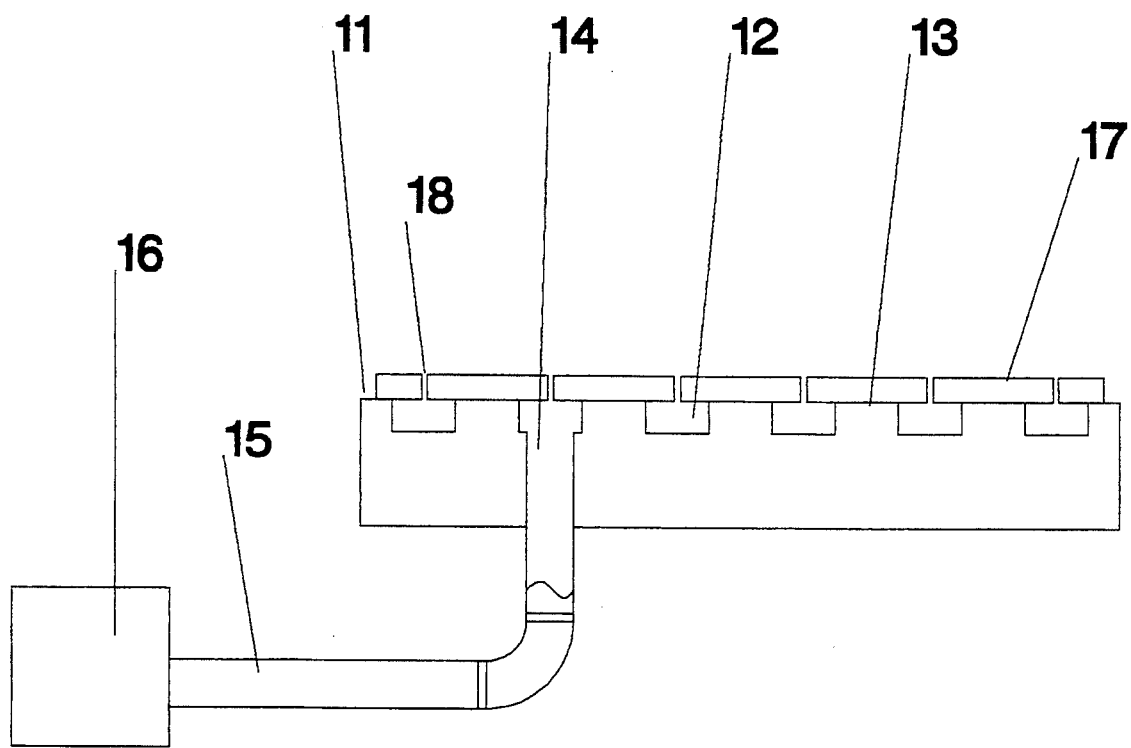
FIG. 4B is a side view of the bed in FIG. 4A with a holed cover.

FIG. 4B is the same as FIG. 4A except that it shows a cover (17) with holes (18) corresponding to the channels.

OPERATION

The basic operation of the present invention is illustrated by FIGS. 1, 2A, 2B, 2C, and 2D. Here, a bed is made for a gantry-style milling machine, shown in FIG. 1. The gantry-style milling machine comprises two slide rails (1), each with a linear drive in the x-direction, three rail support frames (2) which support said slide rails, two base support frames (3) support the rail support frames, a gantry comprising two gantry rails (4), each with a linear drive in the Y direction, and a spindle support assembly with drive in the z-direction (5). Said gantry-style milling machine operates to move the gantry in the X direction by virtue of the drives on the slide rails (1). The gantry-style milling machine further operates to move the spindle support assembly in the Y direction by virtue of the drives on the gantry rails (4).

FIG. 2A illustrates the operation of the gantry-style milling machine in the direction. The spindle (9) is supported on the spindle support assembly with drive (5). The spindle is moved up and down in the Z direction by virtue of the drive on the spindle support assembly. The spindle has a routing bit (10), which the spindle rotates rapidly for purposes of routing. The gantry-style milling machine operates by moving the routing bit into the material to be milled and moving the spindle in the X and Y directions as appropriate. By coordinating the motion in the various directions, the gantry-style milling machine can mill curves.

The method for making the bed of the present invention is to place millable material on bed support means, said bed support means here being the rail support frames (2). In this illustration, said millable material is wood in the form of 2 by 4's placed lengthwise in the X direction. (11) The millable material is then secured by clamps (6) and is planed level by the gantry-style milling machine. Generally, throughout the planing of the bed, the router bit is maintained at constant z. This insures that the bed is Level with the with Z plane and serves as a form of calibration to increase the accuracy of the gantry-style milling machine.

Additionally, the process can be continued to make the bed-into a vacuum table, as seen in FIGS. 3, 4A and 4B. After leveling, milling machine is then used to rout out channels (12) in the bed (11), leaving raised panels (13). A hole (14) is cut in the bottom of one of the channels, and a vacuum hose (15) connected to a vacuum system (16) is connected to a pipe (17) placed in the hole. Material (17) is then placed on top of and added to the bed sufficient to cover the channels therein. In this illustration, the material is a sheet of plywood. Holes are then drilled into the material corresponding to the channels. When the vacuum system is operated, suction is created in the channels and the holes. As such, materials placed on the bed assembly which are to be milled are held down by the suction in the holes. The small holes need not be round, but can be elongated to correspond to more than one vacuum channel.

SUMMARY, RAMIFICATIONS, AND SCOPE

Although the description above contains many specificities, these should not be construed as limiting the scope of the present invention or its applications but as merely providing illustrations of some of the presently, preferred embodiments of this invention.

Thus, the scope of the invention should be determined by the appended claims and their legal equivalents, rather than by the examples given.

I claim:

1. A method for making a bed for a gantry-style milling machine, where said machine has a routing spindle which said machine is capable of moving in the X, Y and Z directions, and where said machine has means to support a bed, comprising:
   a. placing material millable by the machine on said support means;
   b. then planing said material level with the machine;
   c. milling a channel in the material; and
   d. introducing vacuum means into the channel such that suction is introduced into the channel.

2. The method of claim 1, wherein the step of covering the channel with a cover, said cover having a small hole therethrough corresponding to the channel, is taken.

3. A method for making a bed for a gantry-style milling machine., where said machine has a routing spindle which said machine is capable of moving in the X, Y and Z directions, and where said machine has means to support a bed, comprising:
   a. placing material millable by the machine on said support means;
   b. then planing said material level with the machine;
   c. milling a channel in the material;
   d. covering the channel with a cover;
   e. making a small hole therethrough corresponding to the channel; and f. introducing vacuum means into the channel such that suction is introduced through the small hole.

4. A method for making a vacuum table for a gantry-style milling machine, where said machine has a routing spindle which said machine is capable of moving in the X, Y and Z directions and where said machine has a bed made of material millable by the machine, comprising:
   a. milling a channel in the material;
   b. introducing vacuum means into the channel;
   c. covering the channel with a cover, said cover having a small hole therethrough corresponding to the channel and said cover comprising a plurality of elongated wood boards.

5. A method for making a vacuum table for a gantry-style milling machine, where said machine has a routing spindle which said machine incapable of moving in the X, Y and Z directions and where said machine has a bed made of material millable by the machine, comprising:
   a. milling a channel in the material;
   b. introducing vacuum means into the channel;
   c. covering the channel with a cover and then making a small hole through the cover corresponding to the channel, wherein said cover comprises a plurality of elongated wood boards.

* * * * *